United States Patent
Harada et al.

(10) Patent No.: US 8,439,987 B2
(45) Date of Patent: May 14, 2013

(54) METHOD OF PRODUCING CARBONACEOUS MATERIAL-CONTAINING BRIQUETTES USING STEEL MILL DUST CONTAINING OIL

(75) Inventors: Takao Harada, Kobe (JP); Hideaki Fujimoto, Kobe (JP); Hidetoshi Tanaka, Tokyo (JP)

(73) Assignee: Kobe Steel, Ltd., Kobe-shi (JP)

( * ) Notice: Subject to any disclaimer, the term of this patent is extended or adjusted under 35 U.S.C. 154(b) by 362 days.

(21) Appl. No.: 12/676,803

(22) PCT Filed: Aug. 25, 2008

(86) PCT No.: PCT/JP2008/065108
§ 371 (c)(1),
(2), (4) Date: Mar. 5, 2010

(87) PCT Pub. No.: WO2009/037943
PCT Pub. Date: Mar. 26, 2009

(65) Prior Publication Data
US 2010/0218420 A1 Sep. 2, 2010

(30) Foreign Application Priority Data
Sep. 18, 2007 (JP) .................................. 2007-241199

(51) Int. Cl.
*C10L 5/06* (2006.01)
*B30B 13/00* (2006.01)

(52) U.S. Cl.
USPC .................... 44/596; 44/550; 44/566; 44/593

(58) Field of Classification Search .................. 425/135, 425/150, 237; 264/40.1, 40.5, 40.7; 44/550, 44/560, 566, 591, 593, 596
See application file for complete search history.

(56) References Cited

U.S. PATENT DOCUMENTS

| | | | |
|---|---|---|---|
| 4,822,379 A * | 4/1989 | Thompson | 44/589 |
| 2002/0152843 A1 | 10/2002 | Ishihara et al. | |
| 2003/0037485 A1 * | 2/2003 | Carnegie et al. | 44/592 |
| 2005/0050996 A1 * | 3/2005 | Gannon et al. | 75/751 |
| 2006/0278040 A1 | 12/2006 | Harada et al. | |

FOREIGN PATENT DOCUMENTS

| | | |
|---|---|---|
| DE | 41 01 584 A1 | 7/1992 |
| EP | 0 861 909 A1 | 9/1998 |
| EP | 0 960 952 A1 | 12/1999 |
| JP | 49 41211 | 4/1974 |
| JP | 62 290833 | 12/1987 |

(Continued)

OTHER PUBLICATIONS

Notice of Opposition issued Aug. 1, 2012 in European Patent Application No. 08831788.8.

*Primary Examiner* — Pamela H Weiss
(74) *Attorney, Agent, or Firm* — Oblon, Spivak, McClelland, Maier & Neustadt (57) ABSTRACT

The present invention is directed to providing a production method capable of producing carbon composite briquettes having sufficient strength without excessively reducing a production capacity, even using steel mill dust containing oil. This method comprises: adding at least a carbonaceous material and a binder to steel mill dust containing oil and mixing them to form a powdery mixture; compacting the powdery mixture by means of a pressure roll to produce briquettes; and recognizing an increase/decrease in an oil content of the powdery mixture to adjust a rotation speed of the pressure roll so as to lower the rotation speed along with an increase in the oil content.

19 Claims, 6 Drawing Sheets

FOREIGN PATENT DOCUMENTS

| | | |
|---|---|---|
| JP | 3 10024 | 1/1991 |
| JP | 9 192896 | 7/1997 |
| JP | 9-192896 A | 7/1997 |
| JP | 09192896 A * | 7/1997 |
| JP | 10265788 A * | 10/1998 |
| JP | 2000 273554 | 10/2000 |
| JP | 2001 348625 | 12/2001 |
| JP | 2001348625 A * | 12/2001 |
| JP | 2004 269978 | 9/2004 |
| JP | 2005 126826 | 5/2005 |
| RU | 2 138 566 C1 | 9/1999 |

\* cited by examiner

METHOD OF PRODUCING CARBONACEOUS MATERIAL-CONTAINING BRIQUETTES USING STEEL MILL DUST CONTAINING OIL

TECHNICAL FIELD

The present invention relates to a method of producing carbon composite briquettes, using steel mill dust containing oil.

BACKGROUND ART

A conventional reduced iron production process imposes restrictions, such as a need to use costly natural gas as a reducing agent, and a plant location generally limited to localities of natural gas. For this reason, great interest has recently been shown in a reduced ion production process using, as the reducing agent, coal which is relatively low in cost and capable of easing geographic restrictions on selection of a plant location.

As one of the techniques for producing reduced iron using coal, the applicant of this application proposed a method which comprises agglomerating a powdery mixture of coal and an iron oxide-containing material, such as iron ore or steel mill dust, to produce a carbonaceous material-containing metal oxide, and charging the carbonaceous material-containing metal oxide into a rotary hearth furnace to produce reduced iron through heating and reduction (see, for example, Patent Document 1).

Means for the agglomerating of a powdery mixture of coal and an iron oxide-containing material includes spherical pelletization based on tumbling granulation using a pelletizer, cylindrical pelletization based on mechanical extrusion, and briquetting based on pressing using a briquette roll.

However, means for the pelletization based on tumbling granulation has problems, in a process of subjecting a material containing a large amount of fine particles, such as steel mill dust, to tumbling granulation: the problems are 1) a granulation rate becomes lower to cause deterioration in productivity; 2) a large amount of water is required for the granulation due to a great specific surface area of the material, which increases an amount of heat required for drying (i.e., removing the water) in a subsequent process to thereby increase energy consumption; and 3) a variation of a particle size of the material makes the granulation unstable, which is likely to cause a variation in production output (see, for example, Patent Document 2).

The pelletization based on extrusion involves an use of a fluidized material, thus generally requiring an greater amount of water to be contained in the material than that in the tumbling granulation. This further increases a consumption of energy for drying in a subsequent process.

As means for the briquetting using a briquette roll, a double roll-type briquette machine as disclosed, for example, in Patent Document 3 (in the Patent Document 3, a mixer and a pressure forming machine), may be employed. This double roll-type briquette machine comprises a pressure roll adapted to be drivenly rotated by a motor, and a hopper adapted to supply a material to the pressure roll from thereabove, wherein a screw feeder for extruding the material is provided within the hopper.

The use of such a double roll-type briquette machine allows a liquid binder such as molasses or lignin to be used, thus enabling a dry material to be directly agglomerated without addition of water thereto. This makes it possible to drastically reduce the consumption of energy required for drying in a subsequent process.

However, the inventors have been found the following problems (1) to (3) in a process of producing briquettes using steel mill dust, such as electric arc furnace dust, containing a large amount of oil, by means of the double roll-type briquette machine.

(1) There is a need of a forcible feed of a fine-particle material such as electric arc furnace dust to a pressure roll by a transfer device such as a screw feeder, because the dust is hard to be reliably supplied into pockets of the pressure roll only by gravity; however, even the forcible feed will become difficult when the fine-particle material contains a large amount of oil, because it makes the material fairly slippy, thereby deviating an extrusion force of the transfer device (for example, in a screw feeder, deviating an extrusion force of the screw feeder outward in a radial direction thereof). This prevents improvement in strength of briquettes.

(2) In order to overcome the above problem (1) about a reduction in briquette strength, a rotation speed of the pressure roll must be extremely lowered so that the material can be reliably fed into the pockets of the pressure roll. This, however, causes significant reduction in briquette production capacity.

(3) If an amount of liquid binder is increased to simultaneously overcome the two problems (1) and (2) about a reduction in briquette strength and a degradation in briquette production capacity, the fine-particle material will stick onto the presser roll in the pockets thereof to thereby render the production of the briquettes difficult.

[Patent Document 1] JP 2004-269978A
[Patent Document 2] JP 2001-348625A
[Patent Document 3] JP 09-192896A

DISCLOSURE OF THE INVENTION

It is an object of the present invention to provide a production method capable of producing carbon composite briquettes having sufficient strength, even using steel mill dust containing oil, without excessive reduction in briquette production capacity. In order to achieve this object, a carbon composite briquette production method of the present invention comprises: adding at least a carbonaceous material and a binder to steel mill dust containing oil and mixing them to form a powdery mixture; compacting the powdery mixture by means of a pressure roll to produce briquettes; recognizing an increase/decrease in an oil content of the powdery mixture; and adjusting a rotation speed of the pressure roll so as to lower the rotation speed of the pressure roll along with an increase in the oil content.

BEST MODE FOR CARRYING OUT THE INVENTION

An embodiment of the present invention will now be specifically described based on the drawings.

Figure 1:
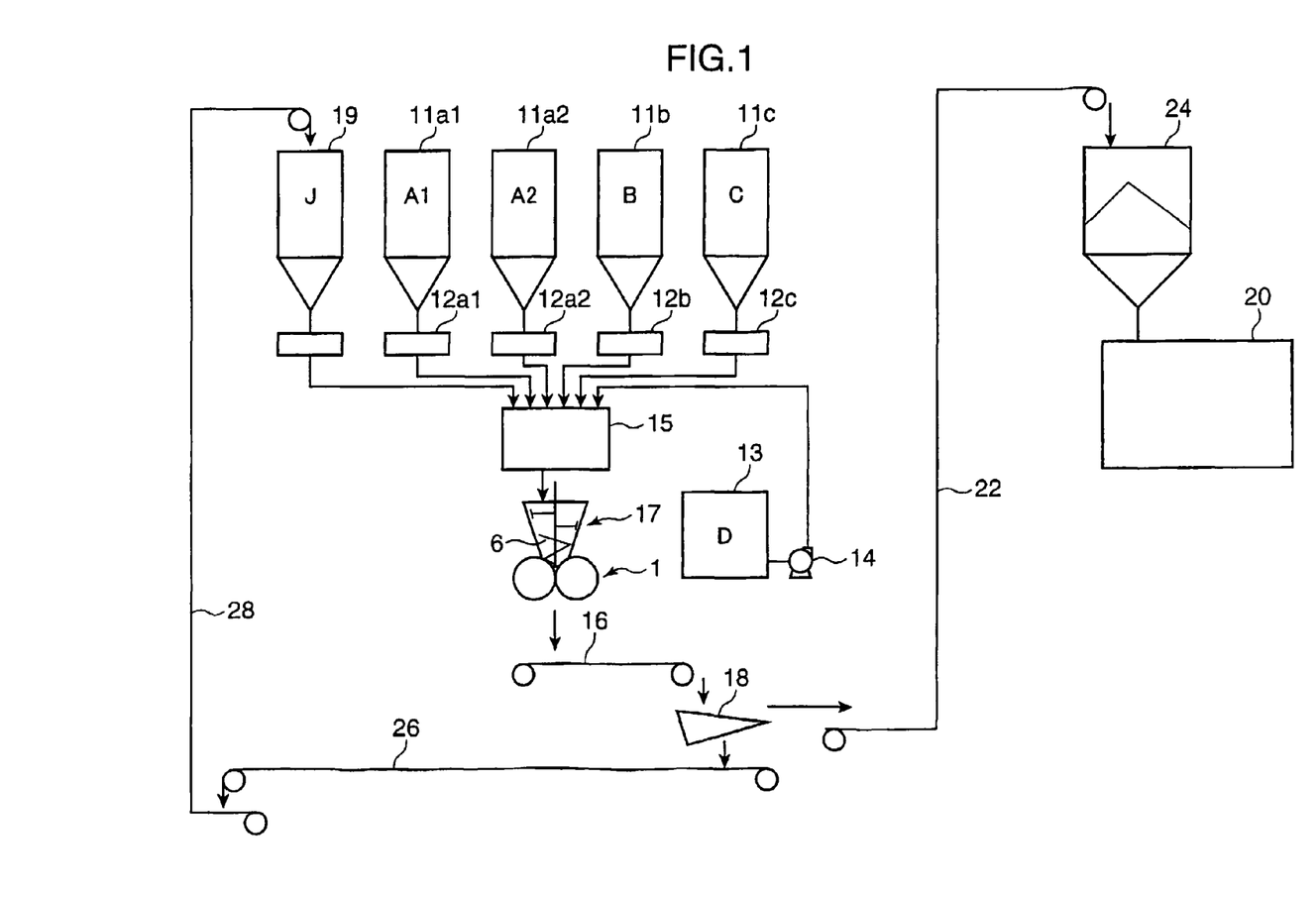
FIG. 1 is a flow diagram showing an outline of a carbon composite briquette production method according to an embodiment of the present invention.

FIG. 1 is a flow diagram showing an outline of a carbon composite briquette production method according to an embodiment of the present invention.

There are shown, in FIG. 1, four material bins 11$a$1, 11$a$2, 11$b$, 11$c$, four feeders 12$a$1, 12$a$2, 12$b$, 12$c$ corresponding to the respective material bins, a mixer 15, and a briquette machine 17.

From the material bins 11$a$1 and 11$a$2, two types of electric arc furnace dust A1 and A2 as metal oxide materials containing a large amount of fine particles are fed out through the feeders 12$a$1, 12$a$2, respectively. These types of electric arc furnace dust A1 and A2 have respective different oil contents (oil content: a mass of oil contained per unit mass in steel mill dust) x1, x2 (wherein x1>x2). In other words, two types of electric arc furnace dust each having a different oil content are separately charged into the respective material bins 11$a$1, 11$a$2. The blending ratio between the types of electric arc furnace dust A1 and A2 fed out from the respective material bins 11$a$1, 11$a$2A is varied to adjust a total amount of oil contained in the blended electric arc furnace dust.

In the same manner, pulverized coal B as a carbonaceous material is fed out from the material bin 11$b$ through the feeder 12$b$ in batches, and slaked lime C as a CaO-containing material, is fed out from the material bin 11$c$ through the feeder 12$c$ in batches. Furthermore, molasses D as a liquid binder is sent out from a tank 13 by a pump 14 at a given rate.

The types of electric arc furnace dust A1 and A2, the pulverized coal B, the slaked lime C and the molasses D are mixed together in the mixer 15 to form a powdery mixture E and be input into the briquette machine 17.

Figure 2:
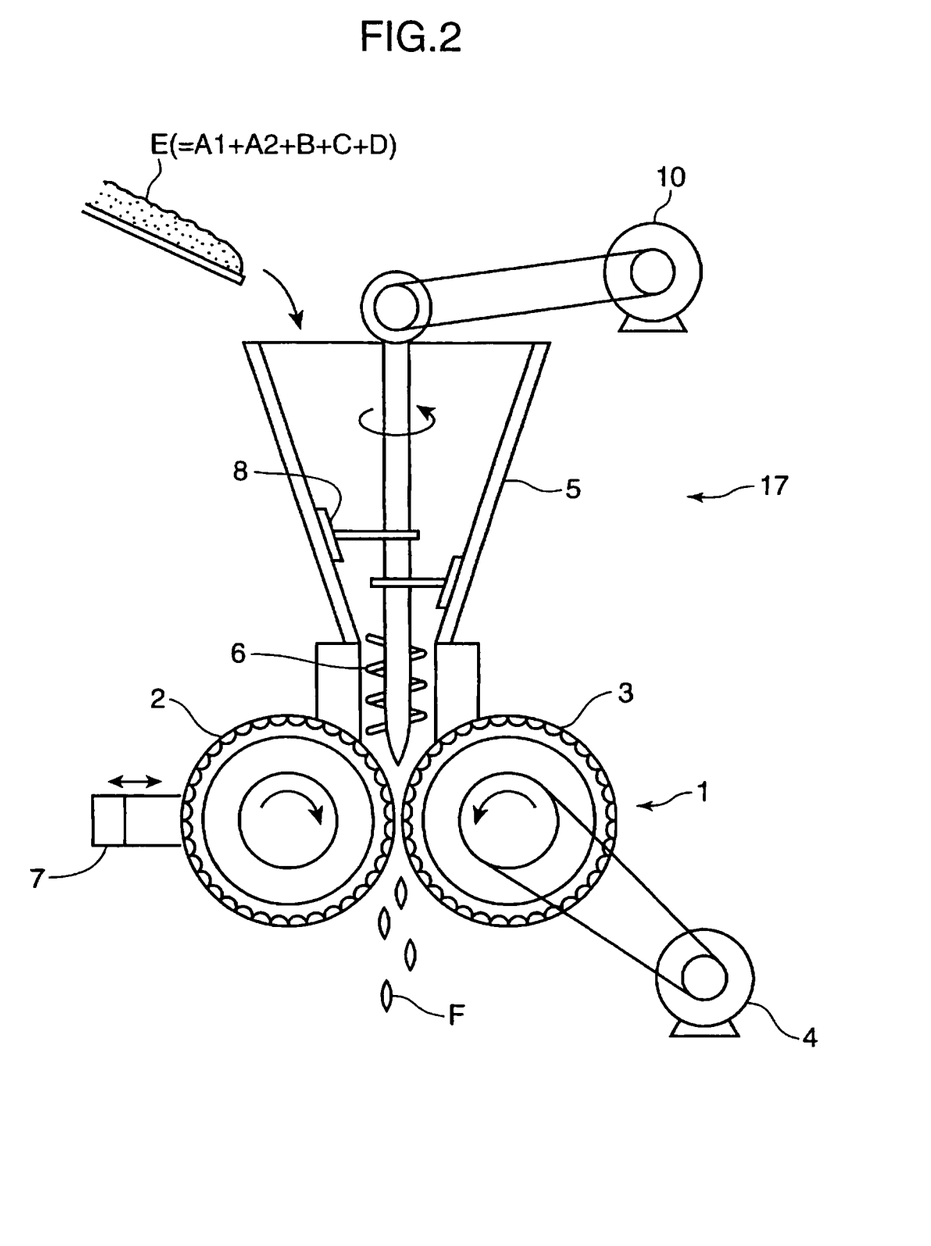
FIG. 2 is a vertical sectional view showing a schematic structure of an apparatus for producing carbon composite briquettes using electric arc furnace dust containing oil, in an embodiment of the present invention

The briquette machine 17, a double roll type as shown in FIG. 2, comprises: a pressure roll 1 including a movable rotating roll 2 and a stationary rotating roll 3; a motor 4 for rotating the two rotating rolls 2, 3; a material-feeding hopper 5 disposed directly above the pressure roll 1; a material-extruding screw feeder 6 provided within the hopper 5; a blade 8 adapted to be rotated within the hopper 5; and a hydraulic cylinder 7 for pressing the movable rotating roll 2 against the stationary rotating roll 3 of the pressure roll 1. A specific structure of the briquette machine 17 is not particularly limited.

The powdery mixture E is input into the hopper 5, and extruded onto the pressure roll 1 according to rotation of the screw feeder 6, thus pressed to be formed (i.e., compacted) into compacts F each having a given shape such as an almond shape or a pillow shape in a plurality of pockets formed in respective outer surfaces of the pair of rotating rolls 2, 3 of the pressure roll 1, while the blade 8 is rotated to prevent the powdery mixture E from adhering onto an inner wall surface of the hopper 5.

The compacts F includes a relatively small compact having a particle size of a given value (typically, 3 to 10 mm) or less, which is undesirable as a material for use in a rotary hearth furnace because it can be hidden behind relatively large compacts F on a hearth to fail to receive sufficient heat transference for high metallization and dezincification ratios in the furnace. For the reason, it is desirable to remove powder-like briquettes and chip-like briquettes. In view of this, the compacts F formed in the briquette machine 17 are carried into a sieve 18 having an opening of a given size (e.g., 5 mm) via a conveyer 16. The sieve 18 screens compacts F into an oversize fraction G and an undersize fraction H, the oversize fraction G collected as product briquettes. The briquettes contained in the oversize fraction G are dropped into a briquette feed hopper 24 via a conveyer 22, supplied into a rotary hearth furnace 20 by an appropriate amount. Meanwhile, the undersize fraction H are returned to the mixer 15 via conveyers 26, 28 and a recycle material bin 19.

Thus, performed in the above system are a mixing step for forming the powdery mixture E, a compacting step of compacting the powdery mixture E by means of the pressure roll 1 of the briquette machine 17 to produce compacts F, a screening step of screening the compacts F and a recycle step of returning the undersize fraction H separated through the screening to the mixing step. Details of each of the steps will be described below.

1. Mixing Step

In the mixing step, two types of electric arc furnace dust A1 and A2 having respective different oil contents x1, x2 are fed out at a given ratio, with which pulverized coal B as a carbonaceous material and slaked lime C as a CaO-containing material are mixed in respective given amounts, and further a liquid binder D such as molasses are added thereto in an appropriate amount. These are mixed together in the mixer 15 to form a powdery mixture E, as described above.

Since the types of electric arc furnace dust A1 and A2 have the respective different oil contents x1, x2, an oil content X of the powdery mixture E to be finally formed can be adjusted by changing a respective blending ratio α1 and α2 of the types of dust A1 and A2 (i.e., a ratio of respective masses of the types of electric arc furnace dust A1 and A2 to the mass of the powdery mixture E).

In this embodiment, a value of the oil content X is determined based on an initial value of a rotation speed of the pressure roll 1 in an after-mentioned compacting step, and the blending ratio is set at a value corresponding to the determined value of the oil content X. Then, respective feed amounts of the types of electric arc furnace dust A1 and A2 from the respective material bins 11$a$1, 11$a$2 are set to obtain the set value of the blending ratio. Further, an increase/decrease in an oil content of the powdery mixture E is recognized. If the oil content deviates from a predetermined allowable range, the set value of the blending ratio is adjusted to allow the oil content to come back within the allowable range again.

Specifically, there is the following relationship between the oil content X of the powdery mixture E and the respective blending ratios α1 and α2 of the types of electric arc furnace dust A1 and A2:

$$X=(\alpha1 \cdot x1 + \alpha2 \cdot x2) \times 100(\%)$$

This relationship enables a reverse calculation to determine a value of each of the blending ratios α1 and α2 for adjusting the oil content X of the powdery mixture E at a given value within the allowable range.

In the present invention, the oil content of the powdery mixture is defined as a mass ratio of oil to a total mass of steel mill dust(s), a carbonaceous material, an iron oxide-containing material and a CaO-containing material, in the powdery mixture. This definition of the oil content of the powdery mixture includes no consideration with a binder (e.g., liquid binder) in the powdery mixture. This is based on an assumption that slipperiness of a material depends an amount of oil residing between solid particles, thus allowing the presence of a binder to be ignored.

(Adjustment of Blending Ratio)

An upper limit value of the allowable range regarding the oil content is set based on a required briquette strength and an allowable range regarding the rotation speed of the pressure roll 1. In this embodiment, the allowable range regarding the oil content is set to a range of 0.5 to 2.0 mass %, as follows.

Figure 3:
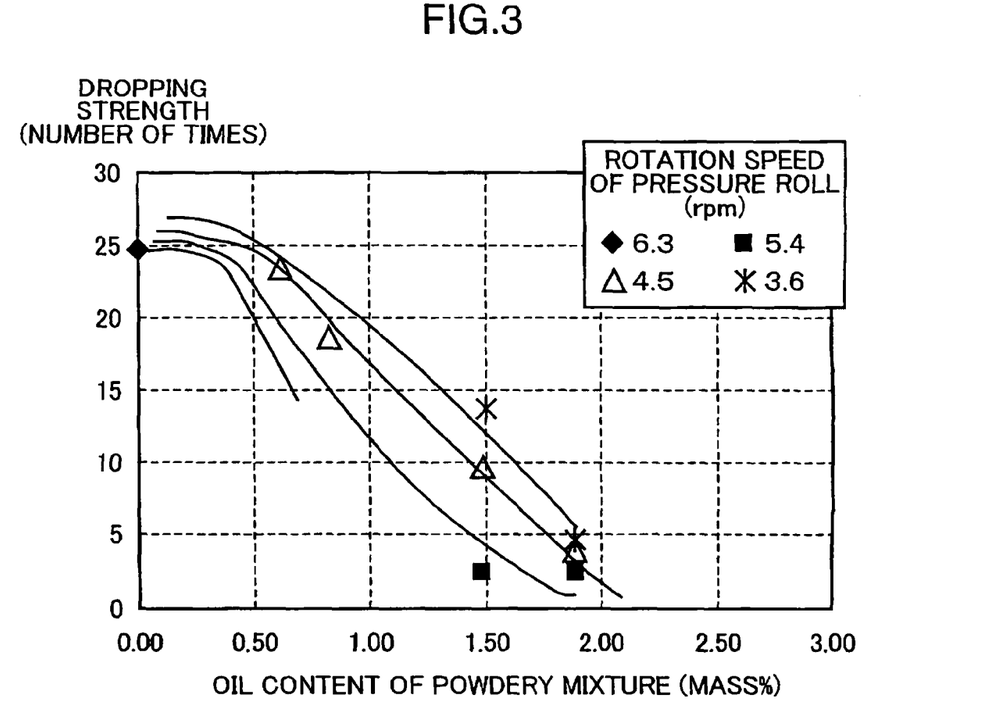
FIG. 3 is a graph showing a relationship between an oil content of a powdery mixture and a dropping strength of a product briquette.

For example, in case where a dropping strength (i.e., the required number of times of dropping a briquette from a height of 45 cm onto an iron plate for breaking or cracking the briquette, as will be described in detail later) is adopted as the briquette strength and five times are required as the dropping strength, the upper limit values of the oil content of the powdery mixture E corresponding to the respective rotation speed of the pressure roll 1 of the briquette machine 17 are determined as shown in the following Table 1, based on data illustrated in FIG. 3 which will be described in detail later in the Section "EXAMPLE".

TABLE 1

| Rotation speed of pressure roll (rpm) | Upper limit value of oil content of powdery mixture (mass %) |
|---|---|
| 3.6 | 1.9 |
| 4.5 | 1.8 |
| 5.4 | 1.4 |
| 6.3 | 1.0 |

Figure 5:
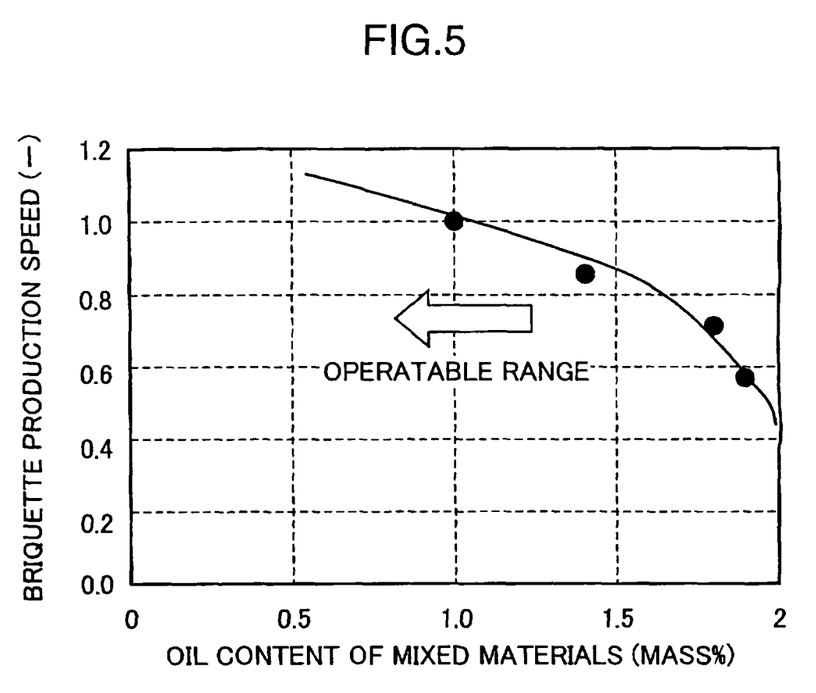
FIG. 5 is a graph showing a relationship between the oil content of the powdery mixture and a briquette production speed.

Although this relationship varies depending on dimensions (e.g., a screw pitch and a screw diameter of the screw feeder 6, and a diameter of the pressure roll 1) of the briquette machine 17 and other factors, the rotation speed of the pressure roll 1 and a briquette production speed are fundamentally maintained in proportional relation to each other. This means that the briquette production speed can be adjusted by changing the rotation speed of the pressure roll 1. Accordingly, given that the briquette production speed is 1.0 when the rotation speed of the pressure roll 1 is 6.3 rpm in Table 1, a relationship illustrated in FIG. 5 is obtained. FIG. 5 shows that, for example, the briquette production speed of 1.0 requires the oil content of the powdery mixture E to be kept at 1.1 mass % or less, while the briquette production speed of 0.8, 0.6 and 0.5 allows the oil content of the powdery mixture E to be set at up to 1.7 mass %, 1.9 mass % and 2.0 mass %, respectively.

However, the oil content of the powdery mixture E is preferably adjusted in a range equal to or less than 2.0 mass %, because of the undesirability of excessive reduction in the briquette production speed.

On the other hand, excessive low oil content of the powdery mixture E allow a treatment of only a small amount of electric arc furnace dust having a high oil content, which is particularly required to be treated; therefore, the oil content of the powdery mixture E is preferably adjusted in a range equal to or greater than 0.5 mass %. However, when only a small amount of the electric arc furnace dust having a high oil content is required, the oil content of the powdery mixture E is not prohibited from being set at less than 0.5 mass %. The setting of such a low oil content makes it possible to produce briquettes while avoiding substantial reduction of the briquette production speed.

As above, the oil content of the powdery mixture E, particularly for treatment of a large amount of electric arc furnace dust having a high oil content, is preferably set in the range of 0.5 to 2.0 mass %. For this reason, in this embodiment, the allowable range regarding the oil content is set in the range of 0.5 to 2.0 mass %, and there is performed, as necessary, an operation of changing the blending ratio so as to put an actual value of the oil out of the allowable range into the allowable range.

A mixing amount of the carbonaceous material exemplified by the pulverized coal B may be determined based on an amount of carbon required for reducing metal elements, such as iron and zinc, contained in the blended electric arc furnace dust (A1+A2).

The addition of the CaO-containing material C into the powdery mixture has not only an effect of improving the briquette strength in combination with the liquid binder D, and an effect of reducing a SOx content in exhaust gas from the rotary hearth furnace by a desulfurization action of CaO, but also an effect of preventing the powdery mixture from adhering onto inner surfaces of the pockets provided in the surface of the pressure roll 1 of the briquette machine 17. For effective exertion of the anti-adhesion effect, an mixing amount of the CaO-containing material C is preferably set at 2 mass % or more with respect to the powdery mixture E. An addition of fine silica sand, which does not have the effect of reducing the SOx content, is also effective for exertion of the anti-adhesion effect.

(Recognition of Increase/Decrease in Oil Content)

Although online measurement of an increase/decrease in an oil content of the powdery mixture E cannot be easily performed, the increase in the oil content can be recognized, for example, from information on the following matters (1) to (4). This is based on a view point that more oil content causes more prominent slip between the screw feeder 6 and the powdery mixture E in the briquette machine 17, degrading production efficiency and reducing the briquette strength.

(1) Decrease in a ratio of partial compacts sorted out as the oversize fraction G to the total compacts F (2) Increase in a ratio of partial compacts sorted out as the undersize fraction H to the total compacts F (3) Decrease in an amount of briquettes in the briquette feed hopper 24

(4) Reduction in a strength of each of the briquettes contained in the oversize fraction G Among them, (1) to (3) can be measured based on an amount of conveyance in the conveyer 22 illustrated in FIG. 1, an amount of conveyance in the conveyer 26 illustrated in FIG. 1 and a weight or an upper surface level of briquettes in the briquette feed hopper 24, respectively. A measurement of (4) requires collecting an appropriate number of briquettes from the oversize fraction G to measure a strength of each of the briquettes one-by-one. Needless to say, the decrease in the oil content also can be recognized in the same manner.

A specific value of the oil content may be calculated, for example, by a method described in "Section 23 Hexane Extract" of "General Sludge Testing in Sewage Water Testing Method" (1997 Version, under the editorship of the Ministry of Construction and the Ministry of Health and Welfare), Japan Water Works Association. This method comprises adding hydrochloric acid to a target substance to make it acidic (pH: 2 or less), subjecting the acidic substance to a dehydration treatment by addition of magnesium sulfate, setting the dehydrated substance in a Soxhlet extractor to perform hexane extraction, and subjecting the obtained hexane extract to quantitative determination.

2. Compacting Step

The powdery mixture E is input as a material of compacts into the hopper 5 of the briquette machine 17, and extruded onto the pressure roll 1 according to rotation of the screw feeder 6, while being kept from adhering onto the inner wall surface of the hopper 5, by rotation of the blade 8. In this process, the limitation of an oil content of the material E to a given value or less depending on the briquette production speed (the rotation speed of the pressure roll 1) suppresses slip of the briquette material (powdery mixture) E. This effectively prevents an extrusion force of the screw feeder 6 from deviating in a radially outward direction thereof, thus enabling a smooth and reliable supply of the material E onto the pressure roll 1 to ensure sufficient briquette strength.

The pair of rotating rolls 2, 3 making up the pressure roll 1, each of which has a plurality of pockets in a surface thereof, compact the material E extruded onto the pressure roll 1 into a given shape, such as an almond shape or a pillow shape, in the pockets, thus producing briquettes F.

A preferable compacting linear pressure in the briquette machine 17 is within the range of 15 to 60 kN/cm. The reason is to ensure a sufficient strength (crushing strength and dropping strength) of each of the briquettes F while preventing such an excessive compacting pressure as to devise the briquette F into halves.

Thus produced, formed without adding water, the briquettes F can be directly charged into the rotary hearth furnace 20 with no drying treatment. Then, at the time of the heat reduction of the briquettes F in the rotary hearth furnace, the oil contained in the briquettes F will be removed (volatilized) from the briquettes F and burnt in the furnace, thus effectively utilized as fuel.

(Adjustment of Briquette Production Speed)

Though depending on a method of blending the types of electric arc furnace dust A1 and A2 together, a variation of the oil content of the blended electric arc furnace dust (A1+A2) is likely to be caused and is hard to be completely prevented, even if the blending ratio between the types of electric arc furnace dust A1 and A2 is fixed. The variation in the oil content of the blended electric arc furnace dust (A1+A2) varies the oil content of the powdery mixture E, which will eventually promote a variation of the briquette strength.

In order to suppress the variation in the briquette strength due to the variation in the oil content of the powdery mixture E, the rotation speed of the pressure roll 1 of the briquette machine 17 is changed to adjust the briquette production speed. Specifically, an increase in the oil can be responded by an decrease in the rotation speed of the pressure roll 1 so as to prevent a reduction in the briquette strength, which can suppress a production loss due to a reduction in the briquette strength. On contrast, a decrease in the oil content permits an increase in the rotation speed of the pressure roll 1 by a value corresponding to the decrease in the oil content, avoiding a reduce in the briquette strength, which increases an average value of the briquette production speed to increase an production output.

If the oil content is adjusted within an adequate allowable range (in this embodiment, in the range of 0.5 to 2.0 weight %), an excessive decrease in the rotation speed of the pressure roll 1 is not required to respond the variation of the oil content. This ensures sufficient briquette strength and high production efficiency.

3. Recycle Step

In this embodiment, the undersize fraction H screened by the sieve 18 are temporarily stored in the recycle material bin 19 as a recycle material J, and returned from the recycle material bin 19 to the mixer 15 by an appropriate amount to be added to a new material (A+B+C). This makes it possible to ensure a high material yield.

According to the addition of a part or entirety J1 of the recycle material J, an aggregated fraction contained in the recycle material J, having smaller sizes than that of the product briquettes G but highly densified, exert the following actions (a) to (c) to thereby increase the strength of the product briquette G.

(a) The addition of the highly-densified compacts increases an average density of the entire material to facilitate an supply thereof by gravity, or increases a speed of extrusion by the screw feeder.

(b) Even a slippy material, such as electric arc furnace dust having high jettability and containing a large amount of oil, can be fed by an excellent transmission of an extrusion force of the screw feeder to the entire material through the compacts.

(c) A compacting pressure of the pressure roll is easily transmitted to a central region of each briquette.

Figure 6:
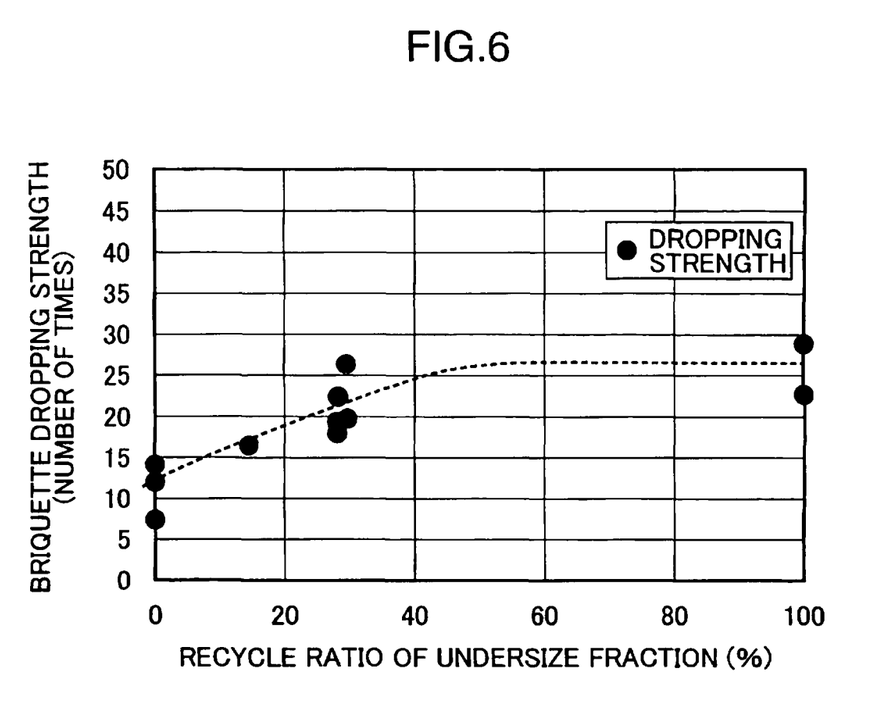
FIG. 6 is a graph showing a relationship between a recycle ratio of an undersize fraction and the dropping strength of the briquette.

In addition, as shown in FIG. 6, since an increase in a recycle ratio (a weight ratio of the undersize fraction H contained in a briquette material to be fed to the pressure roll 1 of the briquette machine, to the briquette material), i.e., a mixing ratio of the undersize fraction H improves the dropping strength of the product briquette, a control of increasing the recycle ratio in response to an increase in the oil content can suppress a reduction of the rotation speed of the pressure roll 1 to endure the briquette strength, and thereby improve the production efficiency. Alternatively, an adjustment of only the recycle ratio, not changing the rotation speed of the pressure roll 1, also can ensure a higher briquette strength than ever before.

[Modification]

Although, in the above embodiment, the two types of electric arc furnace dust A1 and A2 different in oil content from each other are blended together to be used as steel mill dust containing oil, may be blended together and used are three or more types of electric arc furnace dust, among which an oil content of at least one type of electric arc furnace dust is different from that of each of the remaining types of electric arc furnace dust. Furthermore, a part or an entirety of plural types of electric arc furnace dust may be substituted with another steel mill dust containing oil, such as mill scale or mill sludge. Conversely, it is permitted that only a single type of steel mill dust is used while only adjustment of the rotation speed of the pressure roll 1 (including another adjustment associated with the adjustment of the rotation speed of the pressure roll 1, such as adjustment of a rotation speed of the screw feeder 6) is performed for stabilization of the briquette strength.

The oil content of the powdery mixture, adjusted by blending the types of electric arc furnace dust A1 and A2 both of which contains oil together in the above embodiment, may be adjusted by addition of a) electric arc furnace dust containing no oil, b) another steel mill dust such as blast furnace dust or converter dust or c) an iron oxide-containing material containing no oil such as iron, to electric arc furnace dust (irrespective of whether it is a single type or a blend of plural types) in the present invention.

Alternatively, a mixture of a plurality of types of electric arc furnace dust in which the oil content is pre-adjusted may be charged into an electric arc furnace dust bin to be used.

The carbonaceous material, which is illustrated as a pulverized coal B (coal) in the above embodiment, may be coke powder, charcoal, wood chip, waste plastic, waste tire or a combination of two or more of them.

The liquid binder, which is illustrated as a molasses D in the above embodiment, may be lignin, dextrin, starch or a combination of two or more of them. Furthermore, the present invention is not limited to using the liquid binder, but a fibrous binder, such as paper fluff fibers, straw fibers or silicon fibers, may be used. The fibers contained in the fibrous binder are dispersed in a raw briquette to help water vapor be released along the fibers. This relieves a water vapor pressure within the briquette, thereby more enhancing a bursting-resistant characteristic.

The CaO-containing material, which is illustrated as a slaked lime C in the above embodiment, may be limestone, quicklime, fine silica sand, converter slag, or a combination of two or more of them.

EXAMPLE 1

To verify effects of the present invention, carbon composite briquettes were produced at various production speeds by preparing various types of electric arc furnace dust different in oil content, adding pulverized coal as the carbonaceous material, slaked lime as the CaO-containing material, and molasses as the liquid binder, respectively, to each of the types of electric arc furnace dust, to form a mixture, and compacting the mixture in a briquette machine at various rotation speeds of a pressure roll. Then, an influence on the briquette strength was checked through this test.

Respective average particle sizes and chemical compositions of the types of electric arc furnace dust and the pulverized coal used in this test are shown in Table 2, and various blending conditions are shown in Table 3.

TABLE 2

(a) Electric Furnace Dusts

| Item | Unit | Type B | C | D | E | F |
|---|---|---|---|---|---|---|
| Average particle size (*1) | μm | 7.4 | 6.3 | 14.0 | 16.4 | 5.8 |

Composition

| | | | | | | |
|---|---|---|---|---|---|---|
| T. Fe | mass % | 23.9 | 21.6 | 23.5 | 24.7 | 32.5 |
| Zn | mass % | 28.4 | 26.3 | 28.0 | 28.6 | 19.0 |
| Pb | mass % | 2.6 | 1.8 | 2.6 | 2.6 | 0.7 |
| C | mass % | 3.1 | 5.6 | 3.6 | 3.6 | 2.7 |
| Oil (*2) | mass % | 0.91 | 0.67 | 2.15 | 1.80 | 0.00 |
| S | mass % | 0.5 | 0.5 | 0.6 | 0.4 | 0.4 |
| SiO₂ | mass % | 3.6 | 4.8 | 3.6 | 3.7 | 4.7 |
| CaO | mass % | 3.2 | 2.4 | 3.3 | 2.9 | 4.3 |

(b) Pulverized Coal

| Item | Unit | |
|---|---|---|
| Average particle size (*1) | μm | 68.44 |
| Industrial analysis value | | |
| volatile component | mass % | 17.8 |
| Ash | mass % | 9.3 |
| fixed carbon | mass % | 72.9 |
| Elemental analysis value | | |
| C | mass % | 83.3 |
| H | mass % | 4.1 |
| N | mass % | 1.0 |
| S | mass % | 0.3 |
| O | mass % | 1.9 |

(*1) Average particle size: a particle size at a point where a cumulative curve indicates 50%, measured by a microtrack method, the cumulative curve obtained for a certain powder having a particle size distribution on an assumption that a total volume of the powder is 100%.
(*2) Oil: an analysis value according to "General Sludge Testing in Sewage Water Testing Method (Section 23 N-Hexane Extract Measurement Method)" (1997 Version, under the editorship of the Ministry of Construction/the Ministry of Health and Welfare), Japan Water Works Association.

TABLE 3

BLENDING RATIO OF POWDERY MIXTURE (MASS %)

| TEST NO. | TYPE OF ELECTRIC FURNACE DUST | ELECTRIC FURNACE DUST | COAL | SLAKED LIME | MOLASSES [NOT INCLUDED IN 100% MASS % OF POWDERY MIXTURE] | OIL CONTENT OF POWDERY MIXTURE (MASS %) |
|---|---|---|---|---|---|---|
| 1 | B | 89.5 | 10.5 | — | 6.0 | 0.81 |
| 2 | C | 92.0 | 8.0 | — | 6.0 | 0.62 |
| 3 | D | 88.3 | 11.7 | — | 4.0 | 1.90 |
| 4 | D | 88.3 | 11.7 | — | 4.0 | 1.90 |
| 5 | D | 88.3 | 11.7 | — | 4.0 | 1.90 |
| 6 | E | 83.5 | 12.5 | 4.0 | 5.5 | 1.50 |
| 7 | E | 83.5 | 12.5 | 4.0 | 5.5 | 1.50 |
| 8 | E | 83.5 | 12.5 | 4.0 | 4.0 | 1.50 |
| 9 | E | 83.5 | 12.5 | 4.0 | 4.0 | 1.50 |
| 10 | E | 83.5 | 12.5 | 4.0 | 4.0 | 1.50 |
| 11 | F | 85.8 | 14.2 | — | 6.0 | 0.00 |
| 12 | F | 85.8 | 14.2 | — | 9.0 | 0.00 |

| TEST NO. | ROTATION SPEED OF PRESSURE ROLL (rpm) | BRIQUETTE QUALITY | | | |
|---|---|---|---|---|---|
| | | DROPPING STRENGTH (NUMBER OF TIMES) | CRUSHING STRENGTH (kgf/PIECE) | APPARENT DENSITY (g/cm³) | WATER CONTENT (MASS % [DRY BASE]) |
| 1 | 4.5 | 18.6 | 20.8 | 2.82 | 2.43 |
| 2 | 4.5 | 23.3 | 27.3 | 2.66 | 2.39 |
| 3 | 3.6 | 4.6 | 7.3 | 2.24 | 1.63 |
| 4 | 4.5 | 3.8 | 6.9 | 2.22 | 2.19 |
| 5 | 5.4 | 2.2 | 6.0 | 2.20 | 1.70 |
| 6 | 4.5 | 21.5 | 32.7 | 2.40 | 2.33 |
| 7 | 5.4 | 13.0 | 19.7 | 2.22 | 2.47 |
| 8 | 3.6 | 13.7 | 22.3 | 2.45 | 2.95 |
| 9 | 4.5 | 9.6 | 19.4 | 2.26 | 2.10 |
| 10 | 5.4 | 2.5 | 5.6 | 2.05 | 2.10 |

TABLE 3-continued

| 11 | 6.3 | FAILURE IN FORMATION INTO BRIQUETTES | | | |
| 12 | 6.3 | 24.7 | 13.6 | 2.63 | 3.04 |

*: Oil content of powdery mixture is a mass ratio of oil to a total mass of electric arc furnace dust, coal, and slaked lime, in a powdery mixture There were produced powdery mixtures under respective blending conditions as shown in the Table 3, and compacted into briquettes having a volume of about 10 cm$^3$, respectively, by use of the briquette machine 17 as shown in FIG. 2. Specifications of the rotating rolls 2, 3 of the briquette machine 17 were as follows: roll diameter=520 mm; roll width=200 mm; pocket size=30 mm length×25 mm width×7 mm depth; and linear pressure=23 kN/cm.

Each of electric arc furnace dust and CDQ powder, which had already been in a dry powder state, were not subjected to any drying treatment. However, molasses contained a large amount of water, whose content varied so largely that a water content of each of the produced briquettes varied in the range of about 1.6 to 3.0 mass % in dry base, as shown in the Table 3.

The crushing strength of a briquette was measured according to ISO 4700. Specifically, there was measured a minimum value of a compression load which could crush a briquette laid horizontally, applied to the briquette in a thicknesswise direction thereof, and an average of respective measured values for ten briquettes was determined as the crushing strength. The unit "kgf" of the crushing strength corresponds to 9.80665 N.

The dropping strength of a briquette was measured by repetition of dropping a briquette from a height of 45 cm onto an iron plate. Specifically, the number of dropping times required for braking each of ten briquettes were measured, and an average of the measured numbers was determined as the dropping strength.

Figure 4:
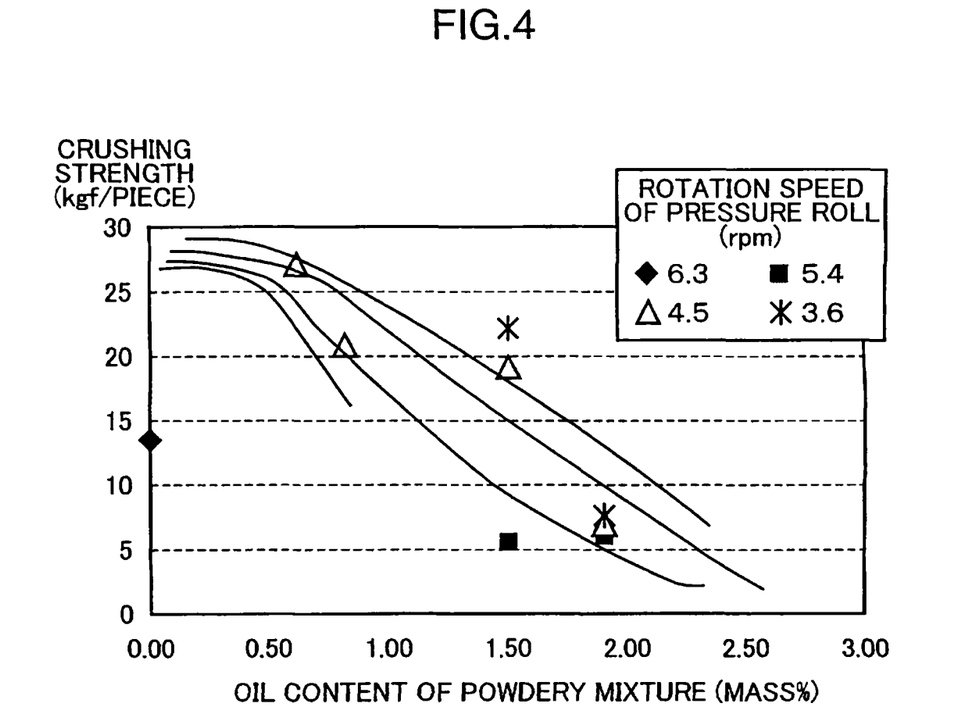
FIG. 4 is a graph showing a relationship between the oil content of the powdery mixture and a crushing strength of the product briquette.

There is shown a measurement result on briquette quality including the crushing strength and the dropping strength in the Table 3, together with the powdery mixture blending conditions. Besides, shown is a relationship between an oil content of the powdery mixture and each of the dropping strength and the crushing strength of a briquette in FIG. 3 and FIG. 4. These FIGS. 3 and 4 shows a tendency that the briquette strength (either of the dropping strength and the crushing strength) is linearly decreased along with an increase in the oil content of the powdery mixture under a condition of a constant rotation speed of the pressure roll (i.e., a condition of a constant briquette production speed), while the briquette strength (either of the dropping strength and the crushing strength) is decreased along with an increase in the rotation speed of the pressure roll (the briquette production speed) under a condition of a constant oil content of the powdery mixture.

This proves that ensuring a given briquette strength while maintaining production efficiency as high as possible is achieved by adjusting the rotation speed of the pressure roll 1 according to the oil content of the powdery mixture, more preferably, while adjusting the oil content of the powdery mixture within a given allowable range.

EXAMPLE 2

Moreover, to verify an effect that the addition of the CaO-containing material into a powdery mixture prevents the powdery mixture from adhering onto the inner surfaces of the pockets of pressure roll, a briquette production test was carried out in the same manner as that in the Example 1, under a condition that the oil content of the powdery mixture and the rotation speed of the pressure roll are fixed at 1.9 mass % and 5.4 rpm respectively, while an amount of slaked lime as the CaO-containing material and an amount of molasses are variously changed. Obtained was the following result.

With no addition of slaked lime, addition of molasses in an amount of 4.0 mass % makes the dropping strength insufficient, that is, 2.2 times (refer to No. 5 in the Table 3). On the other hand, increasing the amount of molasses over 4.0 mass % for improvement of the dropping strength allows the powdery mixture to adhere onto the inner surfaces of the pockets, thus precluding formation of normal briquettes.

In contract, addition of slaked lime in an amount of 4.0 mass % can prevent the adhesion of the powdery mixture onto the inner surfaces of the pockets even if the amount of molasses is increased up to 5.5 mass %, thus allowing formation of normal briquettes, whose dropping strength is sufficient high, i.e., 13 times.

The above result shows that the addition of an appropriate amount of the CaO-containing material into the powdery mixture creates the effect of preventing the powdery mixture from adhering onto the inner surfaces of the pockets of pressure roll.

As above, the present invention provides a production method capable of producing carbon composite briquettes having sufficient strength without excessive reduction of a production capacity, even using steel mill dust containing oil. This method comprises: adding at least a carbonaceous material and a binder to steel mill dust containing oil and mixing them to form a powdery mixture; compacting the powdery mixture by means of a pressure roll to produce briquettes; recognizing an increase/decrease in an oil content of the powdery mixture; and adjusting a rotation speed of the pressure roll so as to lower the rotation speed of the pressure roll along with an increase in the oil content, the adjustment of the rotation speed achieving both maintaining the briquette production capacity and ensuring the sufficient briquette strength.

Preferably, the method of the present invention further comprises adjusting the oil content of the powdery mixture so as to put the oil content within a predetermined allowable range. This adjustment of the oil content eliminates an necessity of excessive increase or excessive decrease in the rotation speed of the pressure roll, thus enabling the pressure roll to be driven at an efficient speed constantly.

The allowable range regarding the oil content of the powdery mixture is preferably a range of 0.5 to 2.0 mass %.

The adjustment of the oil content of the powdery mixture may be performed by blending plural types of steel mill dust each having a different oil content together while changing a blending ratio therebetween. This technique makes it possible to eliminate or reduce a need for adding a particular material for adjusting the oil content.

To the steel mill dust may be added at least one of a CaO-containing material and an iron oxide-containing material containing no oil. In particular, the addition of the CaO-containing material to the steel mill dust in an amount which allows a content of the CaO-containing material in the powdery mixture to be 2.0 mass % or more effectively suppresses adhesion of the powdery mixture onto a surface of the pressure roll.

Preferably, the method of the present invention further comprises screening compacts produced by means of the pressure roll, into an oversize fraction and an undersize fraction, and conveying the oversize fraction to a reducing furnace. This screening contributes to improvement in quality of reduced iron to be produced in the reducing furnace.

In this case, the recognition of the oil content of the powdery mixture may be performed based on at least a ratio of the oversize fraction or the undersize fraction to the compacts. This facilitates the recognition.

In cases where briquettes comprising the oversize fraction are input into a briquette feed hopper for supplying the briquettes into the reducing furnace, an amount of the briquettes in the briquette feed hopper enables the recognition of the oil content of the powdery mixture.

Meanwhile, the undersize fraction is preferably mixed with the steel mill dust together with the carbonaceous material and the binder, thus allowing a high material yield to be ensured.

The method of the present invention is particularly suitable for cases where the powdery mixture is forcibly fed to the pressure roll according to rotation of a screw feeder. Since the oil content of the powdery mixture has a significant impact on slipperiness of the powdery mixture relative to the screw feeder, the adjustment of the rotation speed of the pressure roll based on the increase/decrease in the oil content is extremely effective.

The present invention also provides a method of producing carbon composite briquettes, which comprises: adding at least a carbonaceous material and a binder to steel mill dust containing oil and mixing them to form a powdery mixture; compacting the powdery mixture by means of a pressure roll to produce briquettes; screening compacts produced by means of the pressure roll, into an oversize fraction and an undersize fraction; conveying the oversize fraction to a reducing furnace while mixing the undersize fraction with a feed material to be fed to the pressure roll; recognizing an increase/decrease in an oil content of the powdery mixture; and increasing a weight ratio (i.e., recycle ratio) of the undersize fraction included in the feed material, to the feed material, along with an increase in the oil content. In this method, the undersize fraction is effectively utilized through recycle thereof, the adjustment of the recycle ratio enables an adequate product-briquette strength to be ensured.

The invention claimed is:

1. A method of producing carbon composite briquettes, comprising:
   initialing setting an oil content for a powdery mixture to be formed,
   adding at least a carbonaceous material and a binder to at least one steel mill dust comprising oil,
   mixing the carbonaceous material, the binder and the steel mill dust and optionally, an iron oxide-containing material and a CaO-containing material to form the powdery mixture;
   compacting the powdery mixture by means of a pressure roll to produce briquettes;
   recognizing an increase or decrease in the initially set oil content of the powdery mixture; and
   adjusting a rotation speed of the pressure roll according to the recognized variation in the oil content so as to lower the rotation speed of the pressure roll along with an increase in the oil content,
   wherein the oil content of the powdery mixture is a value defined as a mass ratio of oil to a total mass of the steel mill dust, the carbonaceous material, an iron oxide-containing material and a CaO-containing material in the powdery mixture.

2. The method according to claim 1, further comprising adjusting the oil content of the powdery mixture.

3. The method according to claim 2, comprising adjusting the oil content of the powdery mixture in a range of from 0.5 to 2.0 mass %.

4. The method according to claim 2, comprising blending plural steel mill dusts each having a different oil content together, changing a blending ratio between the plural steel mill dusts and thereby adjusting the oil content of the powdery mixture.

5. The method according to claim 2, comprising adding at least one of a CaO-containing material and an iron oxide-containing material containing no oil to the steel mill dust.

6. The method according to claim 5, comprising adding the CaO-containing material to the steel mill dust to have 2.0 mass % or more of the CaO-containing material in the powdery mixture.

7. The method according to claim 1, further comprising:
   after compacting the powdery mixture by means of the pressure roll and prior to producing the briquettes,
   screening compacts produced by said compacting into an oversize fraction and an undersize fraction, and
   conveying the oversize fraction to a reducing furnace to produce the briquettes.

8. The method according to claim 7, comprising recognizing the oil content of the powdery mixture based on at least a ratio of the oversize fraction or the undersize fraction to the compacts.

9. The method according to claim 7, comprising supplying compacts comprising the oversize fraction into a briquette feed hopper to supply the briquettes into the reducing furnace, and recognizing the oil content of the powdery mixture based on at least an amount of briquettes in the briquette feed hopper.

10. The method according to claim 7, further comprising mixing the undersize fraction with the steel mill dust, the carbonaceous material and the binder.

11. The method according to claim 1, further comprising forcibly feeding the powdery mixture to the pressure roll by rotation of a screw feeder.

12. The method according to claim 1, wherein a mass of at least one of the iron oxide-containing material and the CaO-containing material is zero.

13. The method according to claim 1, wherein the oil content of the powdery mixture is in a range of from 0.62 to 1.50 mass %.

14. The method according to claim 1, wherein the briquettes have a crushing strength in a range of from 5.6 to 32.7 kgf/piece.

15. The method according to claim 1, wherein the briquettes have a water content in a range of from 1.70 to 2.95 mass % in dry base.

16. The method according to claim 1, wherein the powdery mixture is compacted to form the briquettes without adding water.

17. The method according to claim 16, wherein the briquettes are conveyed to a reducing furnace with no drying treatment.

18. The method according to claim 7, wherein recognizing said increase or decrease is carried out by recognizing:

(1) decrease or increase, respectively, in a ratio of partial compacts sorted out as the oversize fraction to the total compacts,
(2) increase or decrease, respectively, in a ratio of partial compacts sorted out as the undersize fraction to the total compacts,
(3) decrease or increase, respectively, in an amount of briquettes in a briquette feed hopper, or
(4) reduction or increase, respectively, in a strength of each of the briquettes contained in the oversize fraction.

19. The method according to claim 1, wherein said initialing setting an oil content for a powdery mixture to be formed is based on an initial value of a rotation speed of the pressure roll.

* * * * *